(12) United States Patent
Yechieli

(10) Patent No.: US 9,134,786 B2
(45) Date of Patent: Sep. 15, 2015

(54) METHODS AND SYSTEMS FOR IMPLEMENTING WAKE-ON-LAN

(71) Applicant: PowerPlug Ltd., Tel Aviv (IL)

(72) Inventor: Eyal Yechieli, Tel Aviv (IL)

(73) Assignee: POWERPLUG LTD., Tel Aviv (IL)

( * ) Notice: Subject to any disclaimer, the term of this patent is extended or adjusted under 35 U.S.C. 154(b) by 274 days.

(21) Appl. No.: 13/737,009

(22) Filed: Jan. 9, 2013

(65) Prior Publication Data

US 2014/0195838 A1 Jul. 10, 2014

(51) Int. Cl.
*G06F 1/32* (2006.01)

(52) U.S. Cl.
CPC .................................. *G06F 1/3209* (2013.01)

(58) Field of Classification Search
USPC .................................................. 713/310, 323
See application file for complete search history.

(56) References Cited

U.S. PATENT DOCUMENTS

| 8,234,701 | B2* | 7/2012 | Cheung et al. ................... 726/12 |
| 2003/0058843 | A1* | 3/2003 | Nishikawa .................... 370/352 |
| 2005/0180326 | A1* | 8/2005 | Goldflam et al. ............. 370/231 |
| 2006/0128350 | A1* | 6/2006 | Hurwitz et al. ............. 455/343.2 |
| 2007/0070998 | A1* | 3/2007 | Sethuram et al. ............. 370/389 |
| 2009/0094317 | A1* | 4/2009 | Venkitaraman ............... 709/203 |
| 2011/0191610 | A1* | 8/2011 | Agarwal et al. ................ 713/310 |
| 2012/0030356 | A1* | 2/2012 | Fletcher ........................ 709/226 |
| 2012/0137146 | A1* | 5/2012 | Karanth et al. ............... 713/310 |
| 2012/0278636 | A1* | 11/2012 | Lin et al. ....................... 713/300 |
| 2013/0205152 | A1* | 8/2013 | Lorch et al. ................... 713/323 |
| 2014/0112203 | A1* | 4/2014 | Rao et al. ...................... 370/256 |

* cited by examiner

*Primary Examiner* — Vincent Tran
(74) *Attorney, Agent, or Firm* — Finnegan, Henderson, Farabow, Garrett & Dunner, LLP

(57) ABSTRACT

Methods and systems for a device in a network are disclosed. The methods and systems compare priority data of the device to priority data of a set of other devices in the network. In addition, the methods and systems determine the device has a priority greater than or equal to a priority of each device in the set of other devices based, at least in part, on the comparison. The methods and systems also select the device as an elected device based, at least in part, on the priority determination. In addition, the methods and systems transmit, using the elected device, a Wake-On-LAN command.

15 Claims, 5 Drawing Sheets

METHODS AND SYSTEMS FOR IMPLEMENTING WAKE-ON-LAN

TECHNICAL FIELD

The present disclosure relates to the field of Wake-On-LAN and, more particularly, methods and systems for implementing Wake-On-LAN in a network having a set of sub-networks and/or virtual local area networks.

BACKGROUND

Organizations often strive to reduce power consumption for a variety of reasons such as, for example, cost reduction. One of the primary methodologies of reducing power consumption is reducing the amount of time that network devices, such as, for example, servers, desktop computers, laptops, and printers, are fully powered on. However, to accommodate business needs, organizations often prefer that network devices be accessible at any time. For example, an employee at home may need to remotely access a computer within an organization's network to handle an emergency during non-regular business hours.

A Wake-On-LAN (WOL) system allows for network devices, such as servers, laptops, desktop computers, and printers, to be accessible even if in power-off sleep states. A network device that is configured to work in a WOL system may be turned on or woken up after receiving a WOL command. For example, a WOL command, commonly known as a "magic packet," may be broadcast by a requesting network device over the data link layer of a network. The magic packet may contain the MAC address of the target network device to be woken up or turned on. The network card of a network device configured to work in a WOL system may receive power even if the network device is in a power-off or sleep state. The network card of the target network device, after detecting a magic packet containing the target nets perk device's MAC address, may cause the target network device to turn on or wake up.

However, many organizations have networks containing a plurality of sub-networks ("subnets") and/or virtual local area networks ("VLANs"). While a magic packet may be broadcast over the data link layer of a given subnet or VLAN, such broadcasts cannot typically be made across different subnets or VLANs. That is, broadcasts over the data link layer of a given subnet or VLAN do not typically reach other subnets or VLANs.

Some organizations may modify their network configuration to allow for WOL commands to be sent between subnets and/or VLANs. For example, a network may be configured such that WOL commands are sent between subnets and/or VLANs over the network layer of a network and then broadcast within subnets and/or VLANs over the data link layer of respective subnets and/or VLANs. However, such network configurations may often be exploited by external security threats, such as, for example, a hacker. In addition, such WOL systems often require increased network maintenance, requiring, for example, the settings of routers in the network to be modified. Many organizations having networks with subnets and/or VLANs find that the benefits of a WOL system do not outweigh the increased security risks and network maintenance associated with such a network configuration.

Moreover, typical WOL systems only be configured to turn on or wake up a network device in response to a user request. That is, typical WOL systems do not turn on or wake up a network device in the absence of a user request. Thus, accessing resources of a turned-off or sleeping network device in existing WOL systems can be complicated and time-consuming.

Improvements in WOL systems, including WOL systems implemented in networks having subnets and/or VLANs, are desirable.

SUMMARY

In one disclosed embodiment, a method for a device in a network is disclosed. The method comprises comparing priority data of the device to priority data of a set of other devices in the network. In addition, the method comprises determining the device has a priority greater than or equal to a priority of each device in the set of other devices based, at least in part, on the comparison. The method also comprises selecting the device as an elected device based, at least in part, on the priority determination. In addition, the method also comprises transmitting, using the elected device, a Wake-On-LAN command.

In another disclosed embodiment, a device in a network is disclosed. The device comprises a processor, a memory, and program code stored in the memory. The program code stored in the memory, when executed by the processor, causes the device to perform the steps of comparing priority data of the device to priority data of a set of other devices in the network, determining the device has a priority greater than or equal to a priority of each device in the set of other devices based, at least in part, on the comparison, selecting the device as an elected device based, at least in part, on the priority determination, and transmitting, using the elected device, a Wake-On-LAN command.

Addition aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

A WOL command may be sent indirectly to a target device in a subnet or VLAN from a device in a different subnet or VLAN without significantly increasing security risk or network maintenance. In particular, a device within a given subnet or VLAN may be elected to detect commands from outside of the given subnet or VLAN to wake up a target device within the given subnet or VLAN. The elected device, after detecting such a command, may broadcast a WOL command within the given subnet or VLAN to wake up or turn on the target device.

In order to select an elected device for a subnet or VLAN, a comparison of priority data associated with devices in the subnet or VLAN may be performed. Priority data may provide a score or ranking indicative of, for example, whether a device participates in power saving operations, the power consumption of a device, the likelihood of a device failing due to power failure, and/or the likelihood of a device to be connected to the network. Using such priority data, one or more highest priority devices can be determined. If one device has a highest priority, that device may be selected as the elected device. If more than one device has an equally high priority greater than the other devices in the subnet or VLAN, a device with the least power consumption from the set of highest priority devices may be selected as the elected device.

Figure 1:
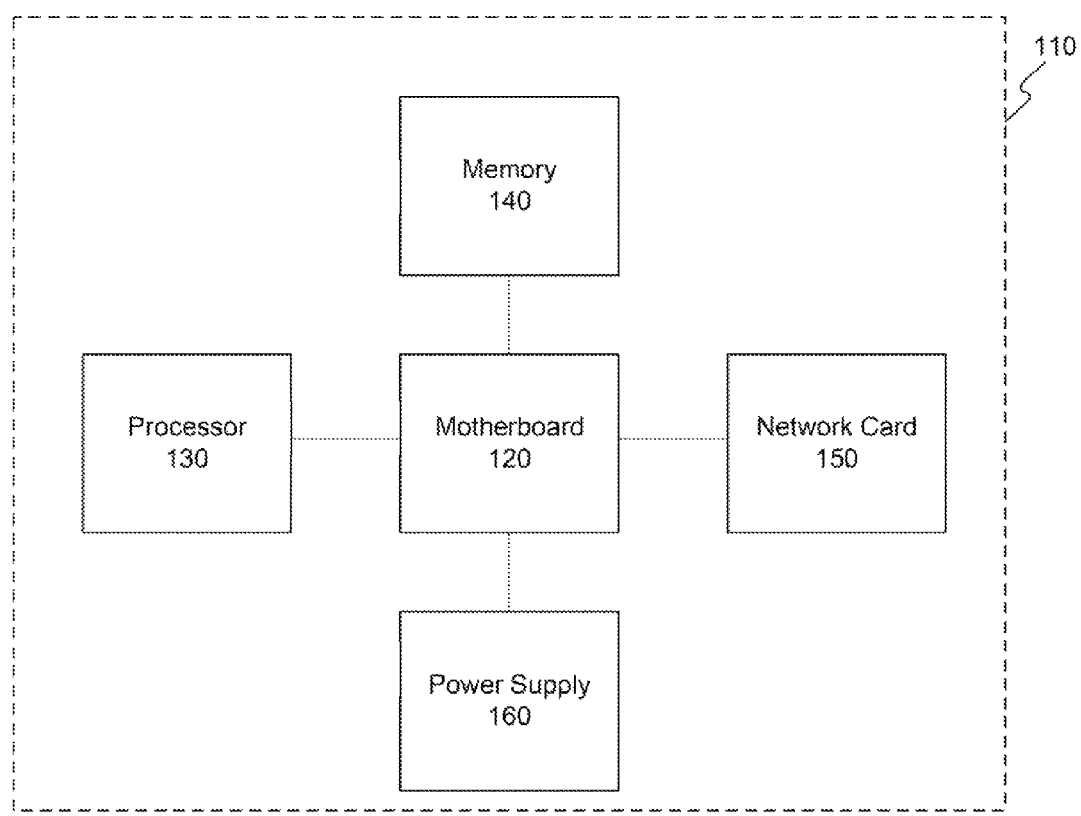
FIG. 1 illustrates an example device that may be used for implementing the disclosed embodiments.

FIG. 1 is a diagram illustrating an example system 100 that may be used for implementing the disclosed embodiments. Computer system 100 may include one or more computers 110, which may be servers, laptop computers, desktop computers and/or other types of computing devices. Computer 110 may include, among other things, one or more of the following components: central processing unit (CPU) 130 configured to execute computer program code to perform various processes and methods, including the embodiments herein described; memory 140, such as RAM, EEPROM, and flash memory, to store data and computer program code; network card 150 configured to enable computer 110 to send and receive data from a computer network; and power supply 160 configured to provide power to computer 110 from an external source such as a battery or A/C outlet. Power supply 160 is configured to provide power to network card 150 even if computer 110 is otherwise turned off or in sleep mode. In addition, network card 150 is configured to receive Wake-On-LAN commands even if computer 110 is otherwise turned off or in sleep mode, and is further configured to cause computer 110 to be turned on or woken up. Each of these components is well-known in the art and will not be discussed further.

Figure 2:
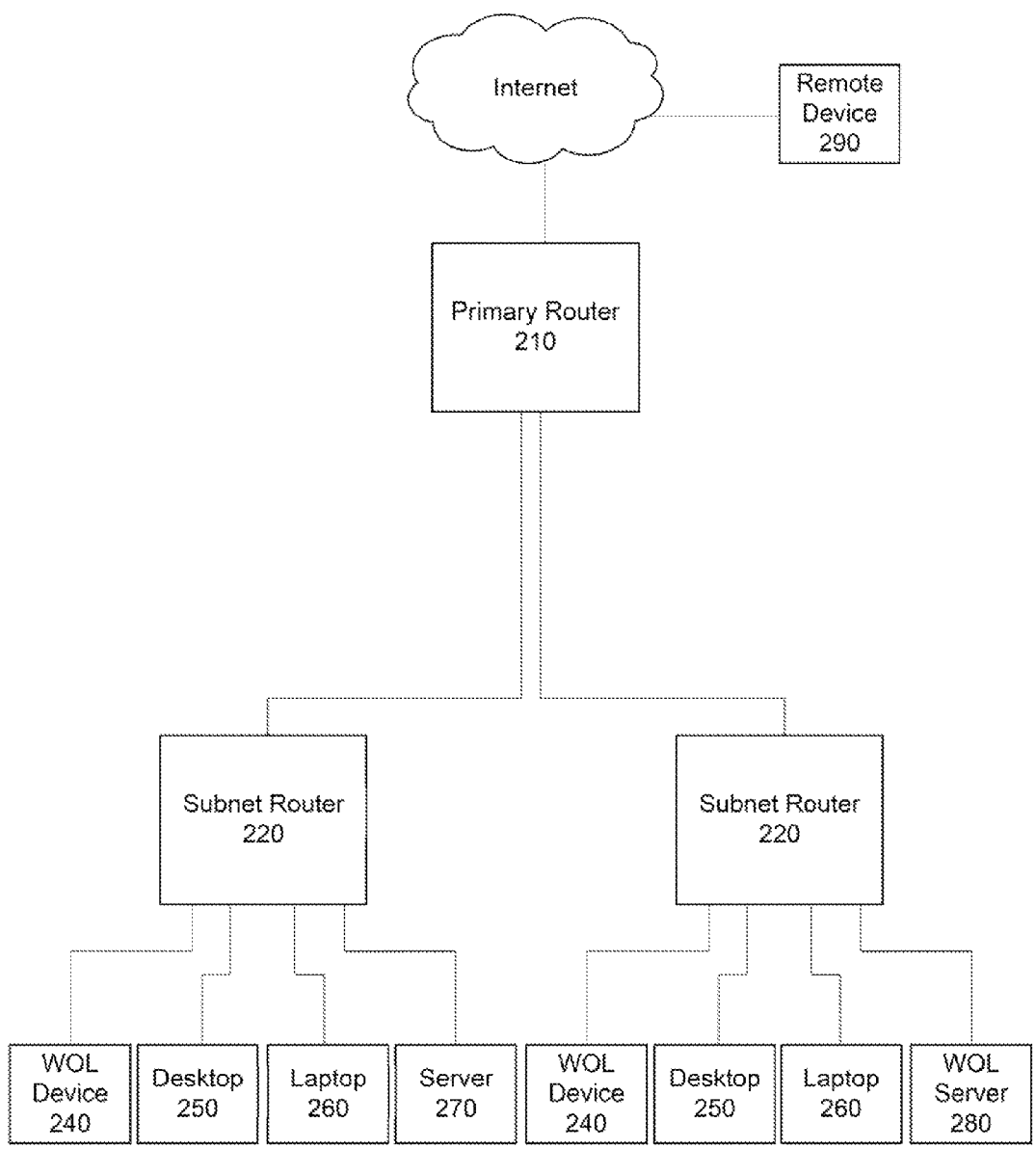
FIG. 2 illustrates an example system that may be used for implementing the disclosed embodiments.

FIG. 2 is a diagram illustrating an example system 200 that may be used for implementing the disclosed embodiments. FIG. 2 provides a simplified depiction of a network having two subnets. The network includes a primary router 210 for enabling data to be sent into and out of the network and for bridging the two subnets. Each subnet includes a subnet router 220 for enabling data to be sent into and out of the subnet, and for enabling data to be sent between devices, such as computers 110, in the subnet. The devices in the subnets may include one or more WOL devices 240, which may be devices specifically configured to operate in a WOL system. For example, WOL device 240 may be a low-power device, powered by a rechargeable battery and/or A/C power, capable of broadcasting WOL commands. The devices in the subnets may also include a desktop computer 250, a laptop computer 260, and a server 270, which may be configured, for example, in the same or substantially the same manner as computer 110. The devices in the subnets may also include one or more WOL servers 280, which may be servers specifically configured to receive, store, and transmit data associated with a WOL system. For example, WOL server 280 may host a website that can be reached by devices in the network in order to wake up or turn on a target device in the network. WOL server 280 may store, for example, respective MAC addresses of devices in the network, IP addresses associated with subnets or VLANs in the network, status information of devices in the network (e.g., whether a device is turned on and awake, asleep, or turned off), and power-cost information indicative of the cost of power. The system 200 may also include a remove device 290, which may be configured, for example, in the same or substantially the same manner as computer 110, and which may connect to the network using, for example, a VPN connection.

The above described example system 200 only includes two subnets as an example. Disclosed embodiments can be implemented with networks having any number of subnets and/or any number of VLANs, including networks having no subnets or VLANs. In addition, disclosed embodiments can be implemented with networks having different arrangements of network devices, in subnets and/or VLANs. For example, some embodiments can be implemented in a network having no WOL devices 240 in some or all of the networks subnets and/or VLANs.

Figure 3:
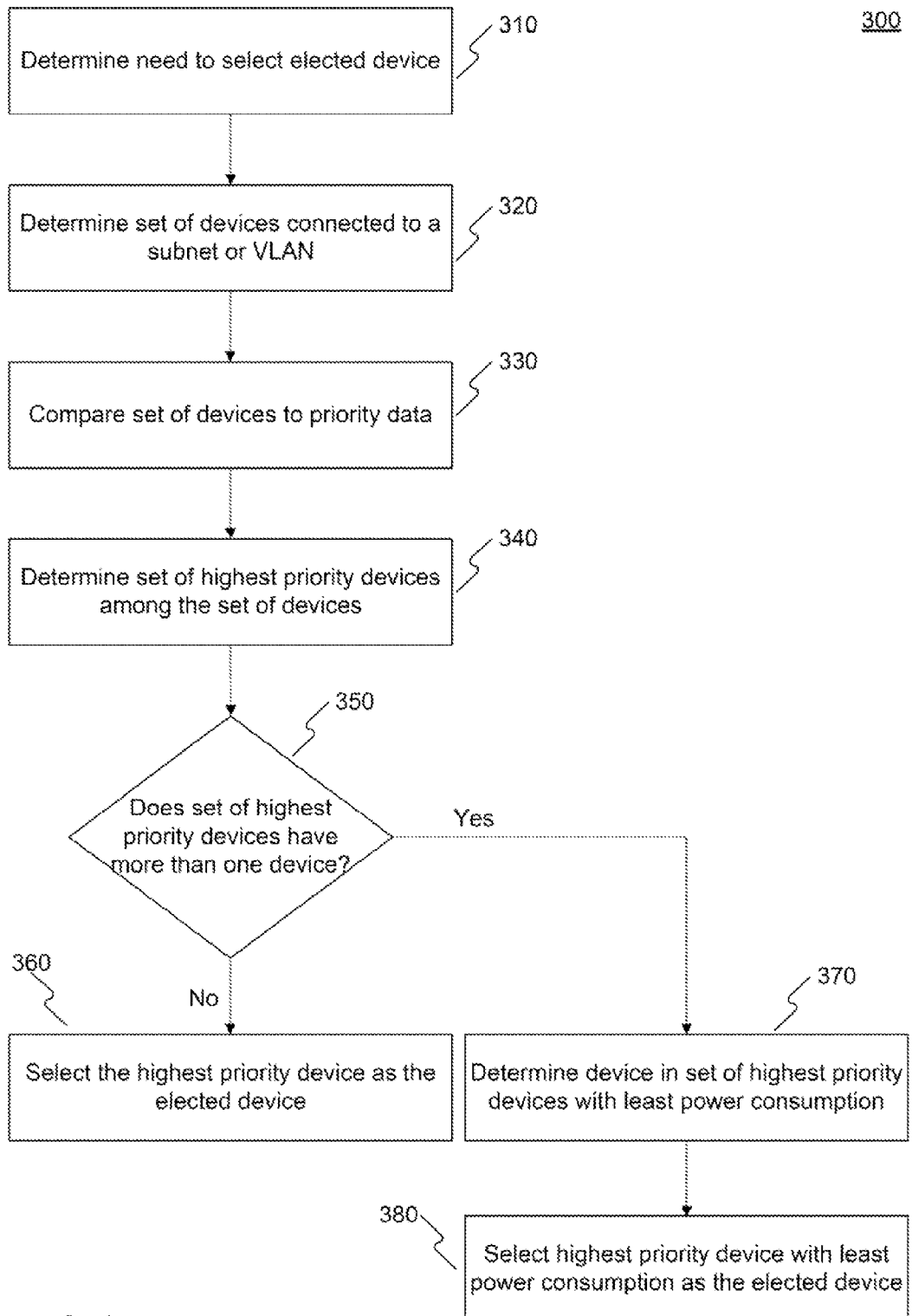
FIG. 3 illustrates an example method for setting an elected device for a subnet or VLAN.

Each of a set of subnets and/or VLANs in a network may have an elected device that is configured to wake up or turn on other devices within the subnet or VLAN. FIG. 3 depicts an example method 300 for selecting an elected device in a WOL system. Method 300 begins by determining a need to set an elected device (step 310). For example, using peer-to-peer communication, the devices in a subnet or ULAN may determine that none of the devices is operating as an elected device. For example, when a WOL system is first implemented, elected devices may not yet be selected. In addition, for example, an elected device may become powered off, go into a sleep mode, or become disconnected from the network. In some embodiments, even if a device is operating as an elected device, a need to reselect an elected device may be determined. For example, an elected device may be selected at predetermined intervals (e.g. once per day) or upon detecting that a new device has been connected to a respective subnet or VLAN.

A set of devices connected to the subnet or VLAN may then be determined (step 320). This determination may be performed, for example, using peer-to-peer communication between each device in the set of devices. In some embodiments the set of devices includes all devices in the subnet or VLAN. However, in some embodiments, some devices in the subnet or VLAN are not included. For example, in some embodiments, network printers are not included within the determined set of devices.

After determining the set of devices, a comparison tray be made of priority data for each device in the set of devices (step 330). In some embodiments, priority data for each device in the set of devices is stored on each device and provides an indication of each device's priority. In other embodiments, priority data of each device in the set of devices is determined by comparing each device's characteristics to a model that maps device characteristics to device priority. In addition, in some embodiments, the priority data may be received from a server, such as WOL server 280. The priority data may be a score or ranking indicative of whether a device participates in power saving operations, the power consumption of a device, the likelihood of a device failing due to power failure, and/or the likelihood of a device to be connected to the network. As an example, a dedicated WOL device may have a highest priority since a dedicated WOL device may not participate in power saving operations, may have a low power consumption, may have a back-up power source, and may be unlikely to be disconnected from the network. A server, for example, may have a second highest priority since a server may not participate in power saving operations, may be unlikely to be disconnected from a network, but may have higher power consumption than a dedicated WOL device and may be more likely to fail due to power failure than a dedicated WOL device. A virtual server, for example, may have a third highest priority since a virtual server may have the properties of a server but may be more likely to be disconnected from a network. A desktop computer, for example, may have a fourth highest priority, since a desktop computer may be powered off during non-work hours to participate in power saving operations. A virtual desktop computer, for example, may have a fifth highest priority, since a virtual desktop computer may have the properties of a desktop computer but may be more likely to be disconnected from a network. A laptop computer, for example, may have a sixth highest priority, since a laptop computer may be powered off during non-work hours to participate in power saving operations and may also be likely to be disconnected from the network to be taken to a remote location such as, for example, an employee's home. The set of highest priority devices among the set of devices within the subnet or VLAN may then be determined (step 340).

The set of highest priority devices may include more than one device. For example, a subnet may exist that includes two servers, one desktop, and one laptop. In such an example subnet, both servers may be highest priority devices. While some implementations could select one of the highest priority devices without further analysis, additional benefits for a WOL system can be derived by analyzing the highest priority devices prior to selecting an elected device. Thus, a determination may be made as to whether the set of highest priority devices has more than one device (step 350). If the set of highest priority devices has only one device, that device may be selected as the elected device (step 360). However, if the set of highest priority devices has more than one device, a determination may be made as to which device in the set of highest priority devices has the least power consumption (step 370). For example, if two servers are included within the set of highest priority devices and one of the servers utilizes less power to operate, the server utilizing less power to operate may be determined. In alternative embodiments, factors other than power consumption may be analyzed such as available processing resources. The method 300 may then select the highest priority device with the least power consumption as the elected device (step 380). In some embodiments, the method 300 is performed for each subnet or VLAN in the network that comprises devices participating in the WOL system.

Figure 4:
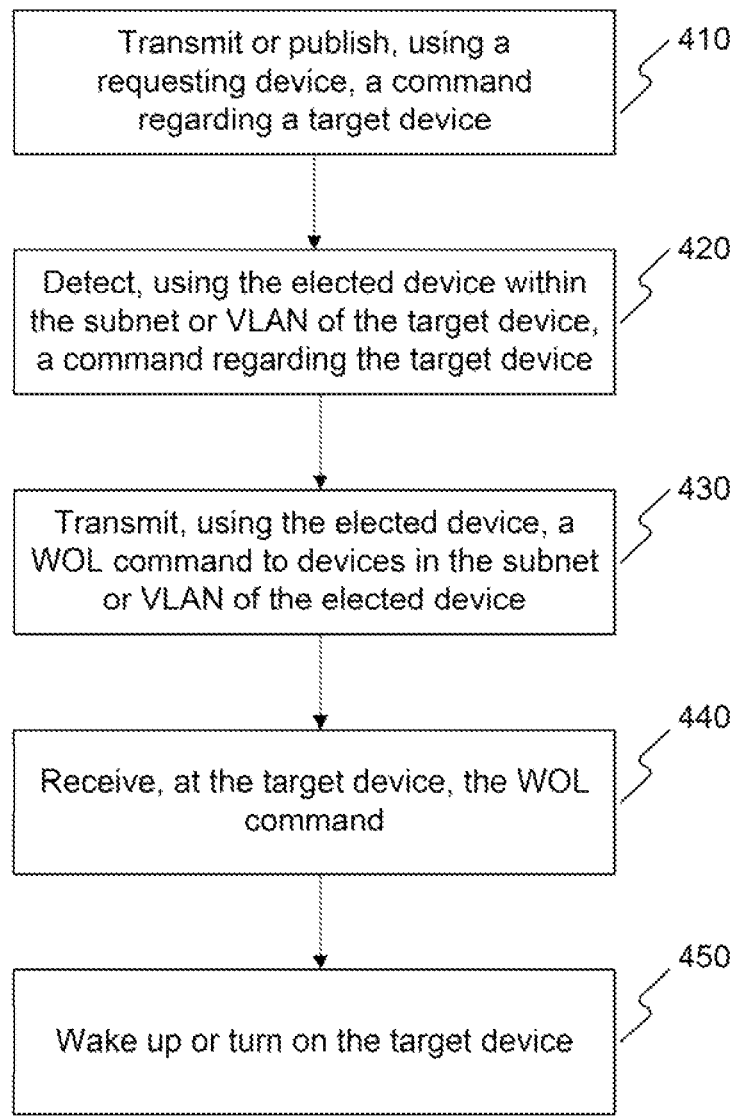
FIG. 4 illustrates an example method for waking up or turning, on a target device.

FIG. 4 depicts an example method 400 for waking up or turning on a target device utilizing an elected device. Method 400 begins when a command regarding a target device is transmitted or published (step 410). In some embodiments, prior to transmitting or publishing the command, a requesting device accesses a server, such as WOL server 280, to retrieve a list of possible target devices within the network. In some embodiments, such a list is retrieved by accessing a website hosted by a server, such as WOL server 280. The retrieved list may include, for one or more of the possible target devices, one or more of: the MAC address of a respective possible target device, the descriptive name of a respective possible target devices, and/or the IP address of an elected device that corresponds to a respective possible target device.

In some embodiments, the requesting device transmits a selection of a target device to the server. In some embodiments, the server, after receiving a transmission from a requesting device, transmits a command containing the target device's MAC address to the IP address of the elected device corresponding to the target device. In other embodiments, the server, after receiving a transmission from a requesting device, publishes data representative of a command to turn on or wake up the target device for the corresponding elected device to detect. Alternatively, in some embodiments, the requesting device may transmit a command regarding the target device to the IP address of the elected device corresponding to the target device.

The elected device within the subnet or VLAN of the selected target device may then detect a command regarding the target device (step 420). For example, in embodiments in which a requesting device or a server transmit a command containing the target device's MAC address to the IP address of the elected device, the elected device may detect the transmitted command. In embodiments in which a server publishes data representative of a command to turn on or wake up the target device, the elected device may poll the server to detect such data.

The elected device may then broadcast a WOL command to one or more devices, including the target device, in the subnet or VLAN of the elected device (step 430). In some embodiments, the WOL command includes the MAC address of the target device. In addition, in some embodiments, the WOL command is sent over the data link layer of the subnet VLAN.

The network card of the target device may then receive the WOL command (step 440). In some embodiments, the network card of the target device makes a determination that the MAC address in the WOL command matches the MAC address of the target device. Upon determining that a WOL command for the target device has been received, the network card of the target device may cause the target device to turn on or wake up (step 450).

Figure 5:
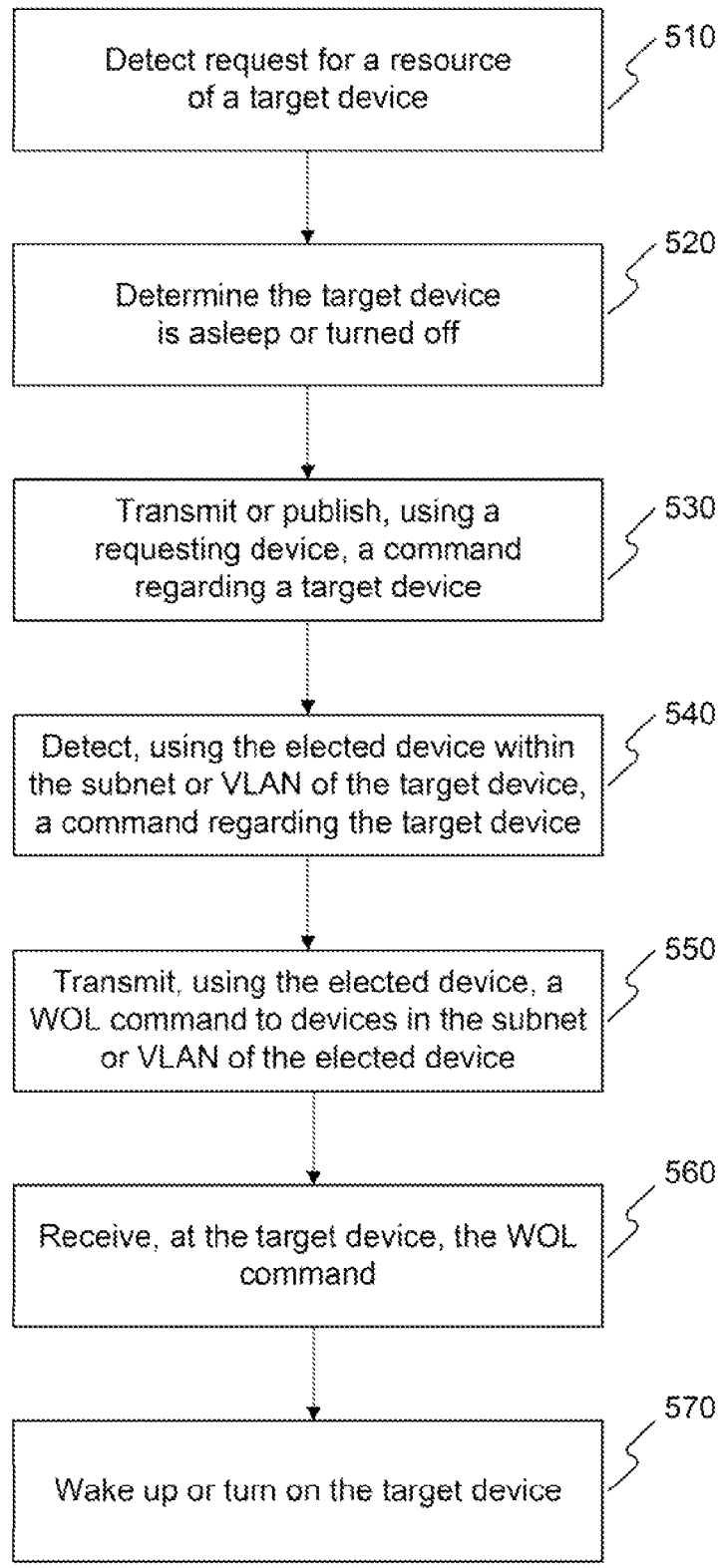
FIG. 5 illustrates an example method for waking up or turning on a target device.

FIG. 5 depicts an example method 500 for waking up or turning on a target device utilizing an elected device. In some embodiments, method 500 begins with a requesting device requesting a resource of a target device (step 510). For example, the target device may be a network computer and the requesting device may request to print a document using a printer connected to the network computer. In some embodiments, the requesting device communicates with a server, such as WOL server 280, to determine whether the target device is asleep or turned of (step 520). Alternatively, in some embodiments, the requesting device transmits data regarding the requested resource to the server and the server determines whether the target device is asleep or turned off. In response to a determination that the target device is asleep or turned off, a command to wake up or turn on the target device may be transmitted or published to an elected device within the subnet or ULAN of the target device (step 530). In some embodiments in which the requesting device determines in step 520 that the target device is asleep or turned off, the requesting device sends a request to wake up or turn on the target device to the server, which transmits or publishes the command to wake up or turn on the target device. In some embodiments in which the server determines in step 520 that the target device is asleep or turned off, the server transmits or publishes the command to wake up or turn on the target device without waiting for an additional request from the requesting device.

The elected device may then detect the command (step 540), in substantially the same manner as described above with respect to step 420 of method 400. The elected device may then broadcast a WOL command (step 550), in substantially the same manner as described above with respect to step 430 of method 400. The network card of the target device may then receive the WOL command (step 560) and wake up or turn on the target device (step 570), in substantially the same manner as described above with respect to steps 440 and 450 of method 400. Once the target device is turned on, the requesting device may then use the resource of the target device. For example, after causing the elected device to wake up or turn on the target device, the requesting device may send the request for the resource to the target device.

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The term "data processing apparatus" encompasses all apparatus devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program software, an application, a software application, a script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receive, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVDROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client/server relationship to each other.

Certain features which, for clarity, are described in this specification in the context of separate embodiments, may also be provided in combination in a single embodiment. Conversely, various features which, for brevity, are described in the context of a single embodiment may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:
1. A method for a device in a network, comprising:
 comparing priority data of the device to priority data of a set of other devices in the network, wherein the priority data reflects, at least in part, a likelihood of being connected to the network;
 determining the device has a priority greater than or equal to a priority of each device in the set of other devices based, at least in part, on the comparison;
 selecting the device as an elected device based, at least in part, on the priority determination; and transmitting, using the elected device, a Wake-On-LAN command to a target device within a sub-network or virtual local area network associated with the elected device;

wherein comparing the priority data occurs in response to determining an unavailability of a previously selected elected device.

2. The method of claim 1, further comprising:

determining the device has a priority equal to at least one device in the set of other devices;

determining the device has a power consumption lower than the at least one device in the set of other devices; and selecting the device as the elected device based, at least in part, on the power consumption determination.

3. The method of claim 2, wherein the power consumption determination is based, at least in part, on power data representative of historical power consumption of the device and the at least one device in the set of other devices.

4. The method of claim 1, further comprising:

detecting, using the elected device, a request to wake up or turn on the target device from a source outside of the sub-network or the virtual local area network of the elected device; and transmitting the Wake-On-LAN command in response to detecting the request.

5. The method of claim 1, further comprising:

detecting a request for a resource of the target device;

determining that the target device is asleep or turned off; and transmitting the Wake-On-LAN command in response to determining the target device is asleep or turned off.

6. The method of claim 1, further comprising:

if the device is a server, determining the priority data of the device is representative of a first priority;

if the device is a desktop computer, determining the priority data of the device is representative of a second priority, wherein the second priority represents a lower priority than the first priority; and if the device is a laptop computer, determining the priority data of the device is representative of a third priority, wherein the third priority represents a lower priority than the third priority.

7. The method of claim 1, further comprising:

if the device is a dedicated Wake-On-LAN device, determining the priority data of the device is representative of a first priority;

if the device is a server, determining the priority data of the device is representative of a second priority, wherein the second priority represents a lower priority than the first priority;

if the device is a virtual server, determining the priority data of the device is representative of a third priority, wherein the third priority represents a lower priority than the second priority;

if the device is a desktop computer, determining the priority data of the device is representative of a fourth priority, wherein the fourth priority represents a lower priority than the third priority;

if the device is a virtual desktop computer, determining the priority data of the device is representative of a fifth priority, wherein the fifth priority represents a lower priority than the fourth priority; and if the device is a laptop computer, determining the priority data of the device is representative off a sixth priority, wherein the sixth priority represents a lower priority than the fifth priority.

8. A device in a network, comprising:

a processor;

a memory;

program code stored in the memory, which, when executed by the processor, causes the device to perform the steps of:

comparing priority data of the device to priority data of a set of other devices in the network, wherein the priority data reflects, at least in part, a likelihood of being connected to the network;

determining the device has a priority greater than or equal to a priority of each device in the set of other devices based, at least in part, on the comparison;

selecting the device as an elected device based, at least in part, on the priority determination; and transmitting, using the elected device, a Wake-On-LAN command to a target device within a sub-network or virtual local area network associated with the elected device;

wherein comparing the priority data occurs in response to determining an unavailability of a previously selected elected device.

9. The device of claim 8, wherein the program code, when executed by the processor, further causes the device to perform the steps of:

determining the device has a priority equal to at least one device in the set of other devices;

determining the device has a power consumption lower than the at least one device in the set of other devices; and selecting the device as the elected device based, at least in part, on the power consumption determination.

10. The device of claim 9, wherein the power consumption determination is based, at least in part, on power data representative of historical power consumption of the device and the at least one device in the set of other devices.

11. The device of claim 8, wherein the program code, when executed by the processor, further causes the device to perform the steps of:

detecting, using the elected device, a request to wake up or turn on the target device from a source outside of the sub-network or the virtual local area network of the elected device; and transmitting the Wake-On-LAN command in response to detecting the request.

12. The device of claim 8, wherein the program code, when executed by the processor, further causes the device to perform the steps of:

transmitting the Wake-On-LAN command in response to a determination that a resource of the target device is requested and that the target device is asleep or turned off.

13. The device of claim 8, wherein the program code, when executed by the processor, further causes the device to perform the steps of:

if the device is a server, determining the priority data of the device is representative of a first priority;

if the device is a desktop computer, determining the priority data of the device is representative of a second priority, wherein the second priority represents a lower priority than the first priority; and if the device is a laptop computer, determining the priority data of the device is representative of a third priority, wherein the third priority represents a lower priority than the third priority.

14. The device of claim 8, wherein the program code, when executed by the processor, further causes the device to perform the steps of:
- if the device is a dedicated Wake-On-LAN device, determining the priority data of the device is representative of a first priority;
- if the device is a server, determining the priority data of the device is representative of a second priority, wherein the second priority represents a lower priority than the first priority;
- if the device is a virtual server, determining the priority data of the device is representative of a third priority, wherein the third priority represents a lower priority than the second priority;
- if the device is a desktop computer, determining the priority data of the device is representative of a fourth priority, wherein the fourth priority represents a lower priority than the third priority;
- if the device is a virtual desktop computer, determining the priority data of the device is representative of a fifth priority, wherein the fifth priority represents a lower priority than the fourth priority; and
- if the device is a laptop computer, determining the priority data of the device is representative of a sixth priority, wherein the sixth priority represents a lower priority than the fifth priority.

15. A method for a device in a network, comprising:
receiving, at a target device, a Wake-On-LAN command from an elected device, wherein the elected device is selected by:
- comparing priority data of a device to priority data of a set of other devices in the network, wherein the priority data reflects, at least in part, a likelihood of being connected to the network;
- determining the device has a priority greater than or equal to a priority of each device in the set of other devices based, at least in part, on the comparison;
- selecting the device as the elected device based, at least in part, on the priority determination;
- wherein comparing the priority data occurs in response to determining an unavailability of a previously selected elected device.

* * * * *